US011748014B2

(12) United States Patent
Gokam et al.

(10) Patent No.: US 11,748,014 B2
(45) Date of Patent: Sep. 5, 2023

(54) INTELLIGENT DEDUPLICATION IN STORAGE SYSTEM BASED ON APPLICATION IO TAGGING

(71) Applicant: EMC IP HOLDING COMPANY LLC, Hopkinton, MA (US)

(72) Inventors: Kurumurthy Gokam, Bangalore (IN); Md Haris Iqbal, Bangalore (IN); Prasad Paple, Bangalore (IN); Kundan Kumar, Bangalore (IN)

(73) Assignee: DELL PRODUCTS L.P., Hopkinton, MA (US)

( * ) Notice: Subject to any disclaimer, the term of this patent is extended or adjusted under 35 U.S.C. 154(b) by 474 days.

(21) Appl. No.: 16/790,789

(22) Filed: Feb. 14, 2020

(65) Prior Publication Data
US 2021/0255789 A1    Aug. 19, 2021

(51) Int. Cl.
*G06F 3/06*     (2006.01)
(52) U.S. Cl.
CPC .......... *G06F 3/0641* (2013.01); *G06F 3/0608* (2013.01); *G06F 3/0659* (2013.01)

(58) Field of Classification Search
None
See application file for complete search history.

(56) References Cited

U.S. PATENT DOCUMENTS

2014/0114932 A1\*   4/2014   Mallaiah ................. G06F 3/067
                                                            707/692

\* cited by examiner

*Primary Examiner* — Michael Alsip
(74) *Attorney, Agent, or Firm* — ANDERSON GORECKI LLP

(57) ABSTRACT

Host computers running applications that store data on a block-based storage system such as a SAN provide hints that differentiate IO data based on which application generated the IO. The hints may include tags that are associated with IO commands sent to the block-based storage system. Each host application is associated with a unique identifier that is placed in the tag. Application name-to-identifier mappings may be sent from the hosts to the block-based storage system. Per-identifier/application deduplication statistics are maintained by the block-based storage system and shared with other block-based storage system. Deduplication is disabled or de-emphasized for IO data generated by applications with statistically low deduplication ratios.

18 Claims, 5 Drawing Sheets

INTELLIGENT DEDUPLICATION IN STORAGE SYSTEM BASED ON APPLICATION IO TAGGING

TECHNICAL FIELD

The subject matter of this disclosure is generally related to data storage systems, and more particularly to deduplication of data that is maintained by block-based data storage systems.

BACKGROUND

Storage Area Networks (SANs) and Network-Attached Storage (NAS) are examples of storage systems that are used to maintain large data sets associated with critical functions for which avoidance of data loss and maintenance of data availability are important. Such storage systems may simultaneously support multiple host servers and multiple host applications. A NAS node may be a server that manages access to drives at the file level. NAS servers maintain filesystems and support file sharing protocols such as network file system (NFS), server message block (SMB), and apple filing protocol (AFP) via which clients can access stored files. A SAN node, also known as a storage array, may be a network of compute nodes that collectively manage access to an array of drives at the block level. The SAN node creates logical storage devices that are used by instances of host applications such as block servers and email servers that run on the host servers. Each logical storage device has a volume ID and contiguous logical address space. The host servers send block-level input-output (IO) commands to the SAN node to access the logical devices, e.g. commands that indicate a range of logical block addresses (LBAs) to be read or written. SAN nodes do not maintain filesystems for stored data and do not support file sharing protocols. Consequently, SAN nodes are unaware of higher-level data structures in the host application data such as files. Moreover, SAN nodes are unaware of the identities of the host applications that generate the data stored on the logical devices.

SUMMARY

All examples, aspects and features mentioned in this document can be combined in any technically possible way.

In accordance with some aspects a method comprises: in a block-based storage system: receiving an input-output (IO) command to write data to a logical device that is maintained by the block-based storage system; receiving a hint that identifies an application that generated the IO command; and selectively performing deduplication of the data based on the hint. In some implementations receiving the hint comprises receiving a unique identifier in a tag. Some implementations comprise updating deduplication statistics associated with the unique identifier. Some implementations comprise updating deduplication enablement settings based on the deduplication statistics. Some implementations comprise sending the deduplication statistics to another block-based storage system. Some implementations comprise updating deduplication enablement settings based on deduplication statistics received from another block-based storage system. Some implementations comprise in a host: obtaining the unique identifier in response to generation of the IO command by the application, wherein the application runs on the host. Some implementations comprise, in the host, sending the unique identifier to the block-based storage system in a tag associated with the IO command. Some implementations comprise, in a host: creating the unique identifier in response to generation of the IO command by the application, wherein the application runs on the host; and providing a mapping between the application and the unique identifier to the block-based storage system.

In accordance with some aspects an apparatus comprises: a block-based storage system comprising: a plurality of compute nodes; an array of drives managed by the compute nodes; and computer program code comprising: instructions that receive an input-output (IO) command to write data to a logical device that is maintained by the block-based storage system; instructions that receive a hint that identifies an application that generated the IO command; and instructions that selectively perform deduplication of the data based on the hint. In some implementations the instructions that receive the hint comprise instructions that receive a unique identifier in a tag. Some implementations comprise instructions that update deduplication statistics associated with the unique identifier. Some implementations comprise instructions that update deduplication enablement settings based on the deduplication statistics. Some implementations comprise instructions that send the deduplication statistics to another block-based storage system. Some implementations comprise instructions that update deduplication enablement settings based on deduplication statistics received from another block-based storage system. Some implementations comprise a host computer comprising processor resources, memory resources, and computer program code comprising instructions that obtain the unique identifier in response to generation of the IO command by the application, wherein the application runs on the host. Some implementations comprise, in the host, instructions that send the unique identifier to the block-based storage system in a tag associated with the IO command. Some implementations comprise a host computer comprising processor resources, memory resources, and computer program code comprising instructions that create the unique identifier in response to generation of the IO command by the application, wherein the application runs on the host and provide a mapping between the application and the unique identifier to the block-based storage system.

In accordance with some aspects a system comprises: a host computer comprising: processor resources; memory resources; and computer program code comprising instructions that obtain the unique identifier in response to generation of an input-output (IO) command by the application, wherein the application runs on the host, and instructions that transmit the unique identifier in a tag associated with the IO command; and a block-based storage system comprising: a plurality of compute nodes; an array of drives managed by the compute nodes; and computer program code comprising: instructions that receive the IO command; instructions that receive the hint that identifies the application that generated the IO command; and instructions that selectively perform deduplication of the data based on the hint. Some implementations comprise instructions that update deduplication statistics associated with the unique identifier and instructions that update deduplication enablement settings based on the deduplication statistics.

Although no advantages should be viewed as limitations of the invention, some implementations may provide more efficient use of SAN processing and memory resources by prioritizing deduplication of data that is more likely to include duplicated blocks and ranges of blocks.

Other aspects, features, and implementations may become apparent in view of the detailed description and figures.

DETAILED DESCRIPTION

Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of physical processors. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g. and without limitation abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, either alone or in any combination.

It is generally understood that significant duplication of host application data may occur in a datacenter environment because multiple hosts may each simultaneously support multiple copies of the same operating system and applications. SAN nodes may implement block-level deduplication (dedup) algorithms to reduce data redundancy by identifying redundant contiguous ranges of blocks and replacing the identified redundant ranges of blocks with pointers to single stored block-range copies. However, deduplication is not equally effective for all data maintained by a SAN because the data generated by certain types of host applications tends to be less likely to create data duplication than other types of host applications. Consequently, SAN processing and memory resources may be inefficiently used in attempts to deduplicate some data that includes little or no redundancy.

Figure 1:
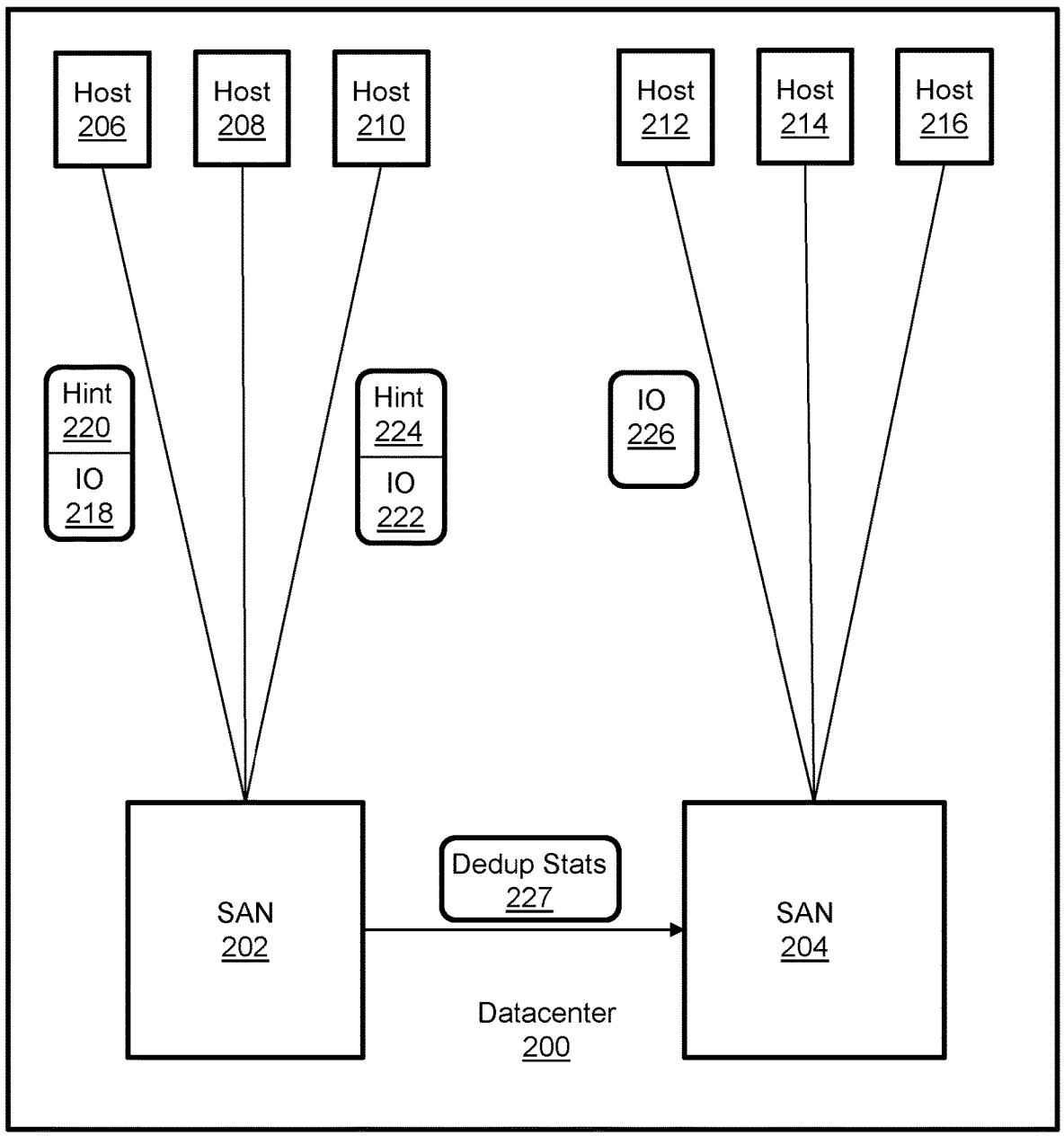
FIG. 1 illustrates a datacenter in which hosts provide hints to SANs to differentiate and identify the applications that generate IOs.

FIG. 1 illustrates a datacenter 200 in which hosts 206, 208, 210, 212, 214, 216 provide hints to SANs 202, 204 to differentiate and indicate the identities of host applications that store data on the SANs. The hints may, but do not necessarily, identify the applications by name or type but do provide application-based differentiation of IO data. For example, and without limitation, the hints may include unique identifiers for each application such that the SAN is aware of all writes generated by an application based on the unique identifier even if the SAN is unaware of the name and type of that application. In some implementations a new hint is generated by a host for each IO that creates or changes data that is stored by one or more of the SANs. In the illustrated example a hint 220 is generated by host 206 to indicate the identity of the host application that generates IO 218, where IO 218 is a command to write data to a logical device presented to the host 206 by SAN 202. Hint 224 is generated by host 210 to indicate the identity of the host application that generates IO 222, where IO 222 is a command to write data to a logical device that is presented to the host 210 by SAN 202. The hints 220, 224 may be different because different host applications may generate the respective IOs 218, 222, even though the data associated with those IOs may be written to the same logical device presented by the SAN 202. A hint is not generated for an IO 226 sent by host 212 to the SAN 204 because the IO 226, e.g. a read command, does not create or update data maintained by the SAN 204. As will be explained in greater detail below, the SANs 202, 204 use the hints to implement intelligent deduplication, such as by determining suitability of the IO data for deduplication as a function of the identity of the application that generated the data. Deduplication of data that is unsuitable for deduplication or that deduplicates poorly may be de-emphasized such as by partially disabling or backgrounding deduplication processes. Moreover, the SAN nodes 202, 204 may calculate and share per-application deduplication statistical information 227 to coordinate intelligent deduplication.

Figure 2:
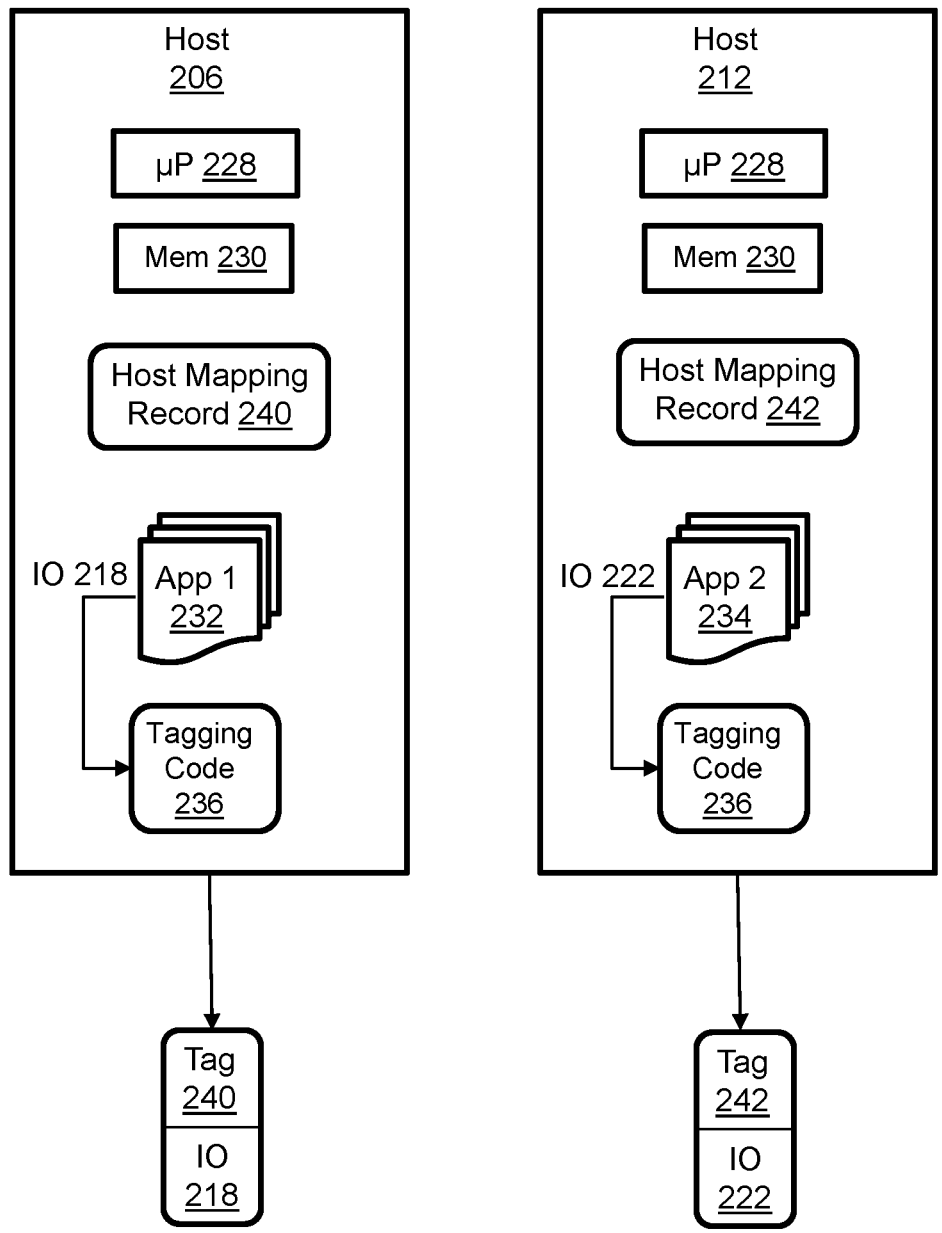
FIG. 2 illustrates the hosts in greater detail, including tagging code that generates tags that function as the hints.

FIG. 2 illustrates hosts 206 and 212 in greater detail. Each host may be a server that includes processing resources 228 and memory resources 230. The processing resources may include any of a wide variety of microprocessors, central processing units (CPUs), and graphics processing units (GPUs), alone or in combination. The memory resources may include random access memory (RAM) of any type and non-volatile memory, alone or in combination. In the illustrated example host 206 supports multiple instances of a first application 232 and host 212 supports multiple instances of a second application 234, where the first application is different than the second application. The host application instances may run in containers or on virtual machines (VMs) as is known in the art. An instance of the first application 232 generates IO 218 and an instance of the second application 234 generates IO 222. Tagging code 236 running independently on the respective hosts 206, 212 generates tags that include unique ID values that identify the applications. Host mappings records 240, 242 include mappings between the names of applications running on the respective hosts and the unique IDs corresponding to those applications. In the illustrated example, the tagging code 236 running on host 206 uses host mapping record 240 to generate tag 240 to identify the first application 232 as the generator of IO 218. Similarly, the tagging code 236 running on host 212 uses host mapping record 242 to generate tag 242 to identify the second application 234 as the generator of IO 222. The respective unique IDs are inserted into the tags and the tags are associated with the IOs for which the generating application is being identified. For example, a field for proprietary information in the IO commands may be used to transmit the tags.

Figure 3:
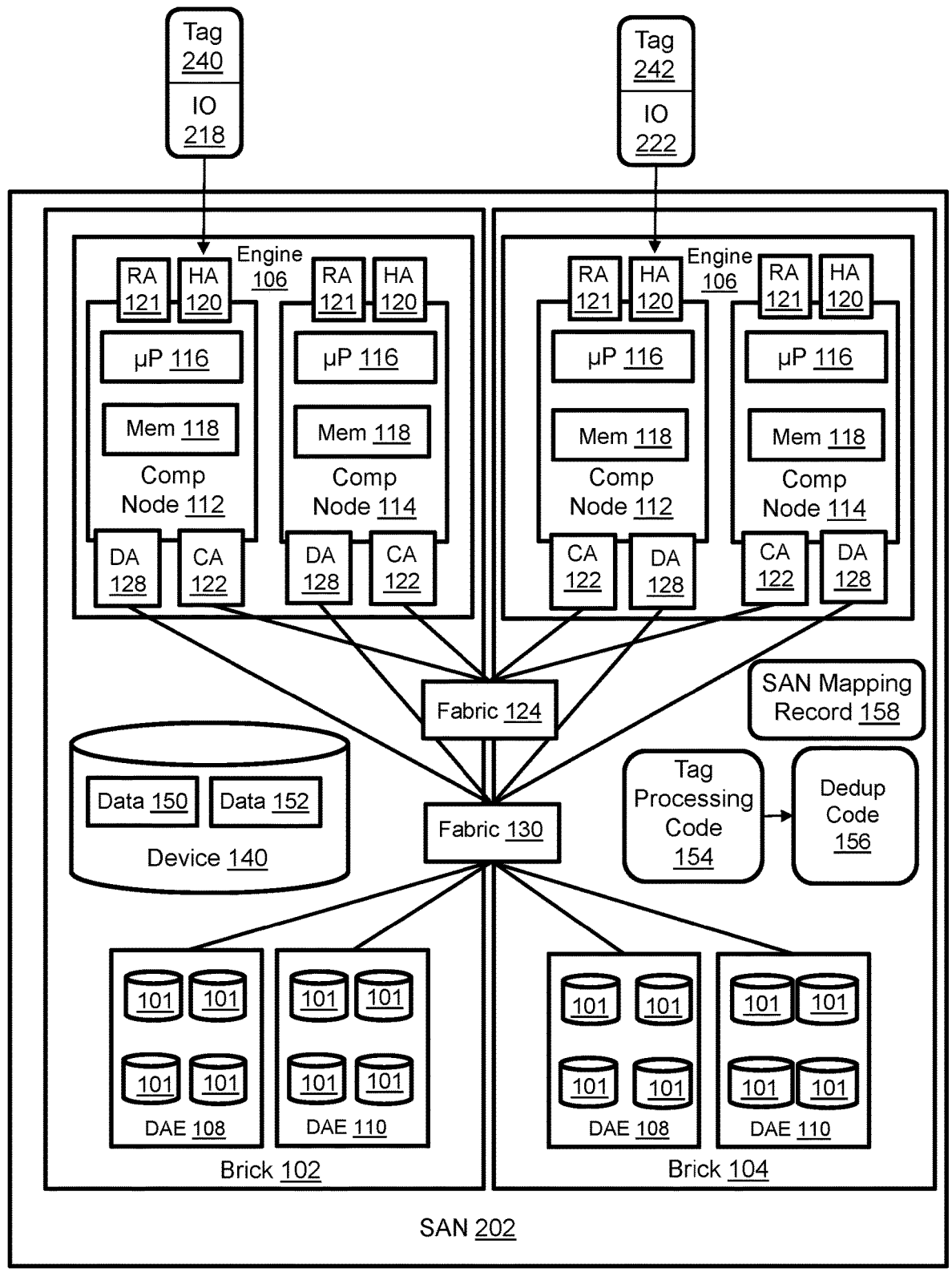
FIG. 3 illustrates one of the SANs in greater detail, including tag processing code.

FIG. 3 illustrates SAN 202 in greater detail. The SAN, which may be referred to as a storage array, includes one or more bricks 102, 104. Each brick includes an engine 106 and one or more drive array enclosures (DAEs) 108, 110. Each DAE includes managed drives 101 of one or more technology types. Examples may include, without limitation, solid state drives (SSDs) such as flash and hard disk drives (HDDs) with spinning disk storage media. Each engine 106 includes a pair of interconnected computing nodes 112, 114, which may be referred to as "storage directors." Each computing node includes processing and memory resources such as at least one multi-core processor 116 and local memory 118. The processor may include central processing units (CPUs), graphics processing units (GPUs), or both. The local memory 118 may include RAM of any type, non-volatile memory (NVM) such as storage class memory (SCM), or both. Each computing node includes one or more host adapters (HAs) 120 for communicating with the hosts. Each host adapter has resources for servicing IOs, e.g. processors, volatile memory, and ports via which the hosts may access the SAN. Each computing node also includes a remote adapter (RA) 121 for communicating with other storage systems such as SAN 204 (FIG. 1). Each computing node also includes one or more drive adapters (DAs) 122 for communicating with the managed drives 101 in the DAEs 108, 110. Each drive adapter has resources for servicing IOs, e.g. processors, volatile memory, and ports via which the computing node may access the DAEs. Each computing node may also include one or more channel adapters (CAs) 122 for communicating with other computing nodes via an interconnecting fabric 124. Each computing node may allocate a portion or partition of its respective local memory 118 to a shared memory that can be accessed by other computing nodes, e.g. via direct memory access (DMA) or remote DMA (RDMA). The paired computing nodes 112, 114 of each engine 106 provide failover protection and may be directly interconnected by communication links. An interconnecting fabric 130 enables implementation of an N-way active-active backend. In some implementations every DA in the SAN can access every managed drive 101.

Data created and used by the host applications 232, 234 (FIG. 2) running on the hosts is nominally maintained on a logical storage device 140 that can be discovered and accessed by the hosts. From the perspective of the hosts the logical storage device 140 is a single drive having a set of contiguous fixed-size logical block addresses (LBAs) on which data used by instances of the host applications resides. However, the host application data is stored at non-contiguous addresses on various managed drives 101. Without limitation, the logical storage device 140 may be referred to as a source device, production volume, production device, or production LUN, where LUN (Logical Unit Number) is a number used to identify logical storage volumes in accordance with the Small Computer System Interface (SCSI) protocol. In the illustrated example logical storage device 140 is used by instances of both host applications 232, 234 (FIG. 2) for storage of host application data. More particularly, data 150 is generated by host application 232 (FIG. 2) and data 152 is generated by host application 234 (FIG. 2).

To service IOs from instances of a host application the SAN 202 maintains metadata that indicates, among various things, mappings between LBAs of the logical storage device 140 and addresses with which extents of host application data can be accessed from the shared memory and managed drives 101. In response to an IO command from an instance of one of the host applications to READ data from the logical device 140 the SAN uses the metadata to find the requested data in the shared memory or managed drives. If the requested data is already present in memory when the IO command is received it is considered a "cache hit." When the requested data is not in the shared memory when the IO command is received it is considered a "cache miss." In the event of a cache miss the accessed data is temporarily copied into the shared memory from the managed drives and used to service the IO command, i.e. reply to the host application with the data via one of the computing nodes. In the case of an IO command to write data to the logical device the SAN copies the IO data into the shared memory, marks the corresponding logical storage device location as dirty in the metadata, and creates new metadata that maps the logical device address with a location to which the data is eventually written on the managed drives. READ and WRITE "hits" and "misses" occur depending on whether the stale data associated with the IO command is present in the shared memory when the IO command is received.

Tag processing code 154 obtains the unique IDs from the tags 240, 242 associated with the IOs 218, 222 and manages application-based deduplication by deduplication code 156. The unique IDs from the tags are used as indexes into a SAN mapping record 158 that includes deduplication disposition settings and deduplication statistics, e.g. dedup ratio, for data associated with each unique ID. If the tag processing code 154 determines from the SAN mapping record that the data 150 generated by the first application 232 (FIG. 2) is unsuitable for deduplication, e.g. based on an existing deduplication ratio for that unique ID being below a predetermined threshold, then the tag processing code may prevent the deduplication code 156 from performing deduplication in the data of IO 218. In contrast, if the tag processing code 154 determines from the SAN mapping record that the data 152 generated by the second application 234 is suitable for deduplication, e.g. based on an existing deduplication ratio for that unique ID above a predetermined threshold, then the tag processing code may prompt the deduplication code 156 to perform deduplication in the data of IO 222. The deduplication code 156 may implement any of a wide variety of block-level deduplication algorithms to determine whether blocks of the data of IO 222 are duplicated in data 152 or device 140.

Figure 4:
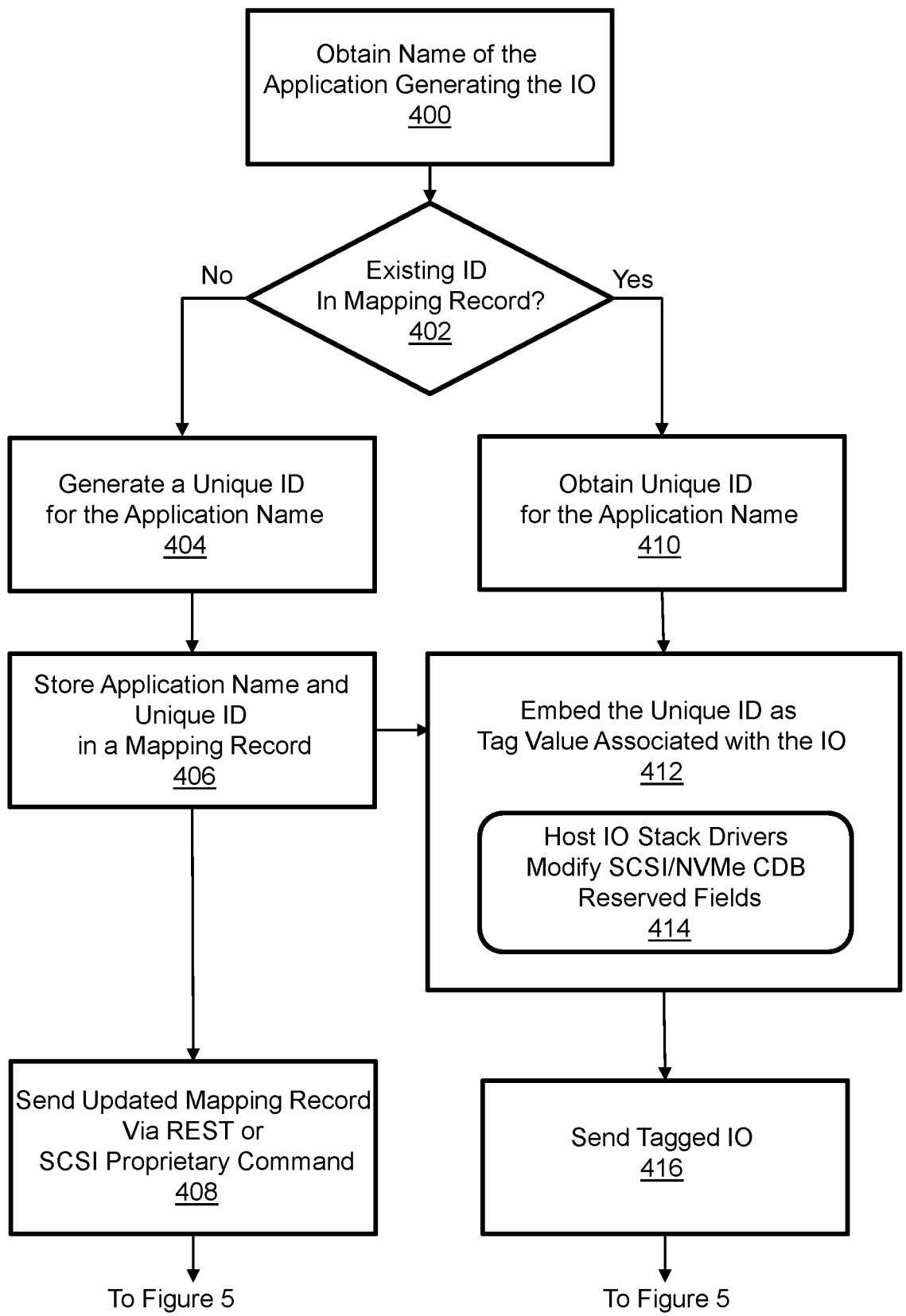
FIG. 4 illustrates operation of the tagging code in greater detail.

FIG. 4 illustrates operation of the tagging code 236 (FIG. 2) in greater detail. The tagging code runs on the hosts and is responsive to issuance of IOs by the hosted application instances. When an application instance running on a host generates an IO, the tagging code on that host obtains the name of the application that generated the IO as indicated in step 400. In the Linux operating system this may be implemented with Struct task_struct->comm. Examples of application names might include MongoDB, Oracle Database, and Apache Cassandra. The name of the IO-generating application is used as an index into the host mapping record as indicated in step 402 to determine whether a unique ID for the application name is present in the mapping record. Examples of unique IDs may include decimal integers, binary, and hex values, for example, and without limitation. If the mapping record does not include the application name and associated unique ID, then a new unique ID is generated for the application name as indicated in step 404. The application name and generated unique ID are stored in the mapping record as indicated in step 406. The updated mapping record is sent to the SAN or SANs used by the application as indicated in step 408. This may be accomplished using Representational State Transfer (REST) or SCSI proprietary commands, for example and without limitation. If a unique ID for the obtained application name already exists in the host mapping record as determined in step 402 then the unique ID for the application name is obtained from the host mapping record as indicated in step 410. The unique ID is then inserted into the tag that is associated with the IO as indicated in step 412. Step 412 may include modification of SCSI or NVMe CDB reserved fields as indicated in step 414, e.g. the reserved fields may be the tags into which unique ID values are entered. Note that step 412 is performed when the application name is initially encountered as indicated by flow from step 406 to step 412. The tagged IO is sent to the SAN as indicated in step 416.

Figure 5:
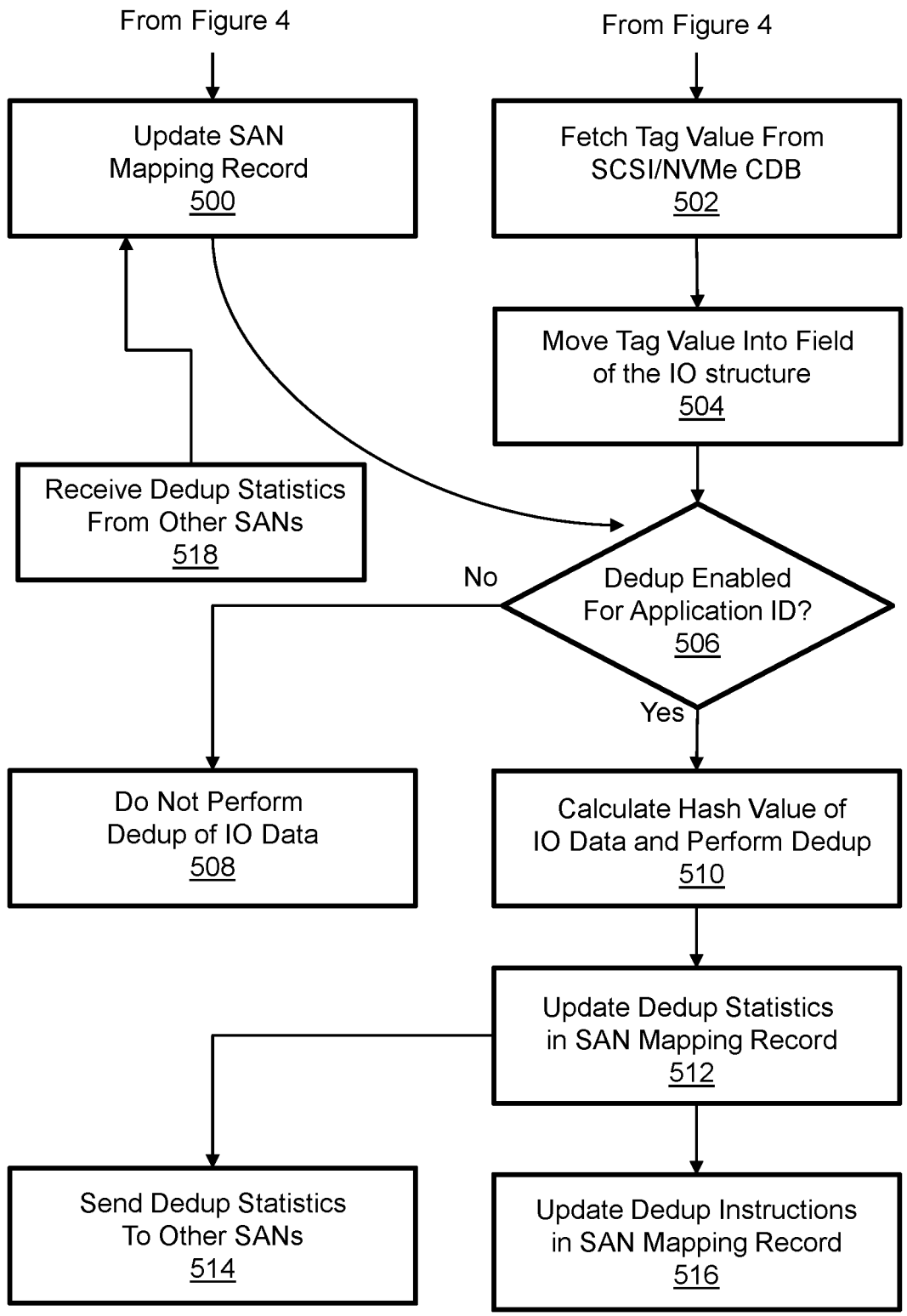
FIG. 5 illustrates operation of the tag processing code in greater detail.

FIG. 5 illustrates operation of the tag processing code 154 (FIG. 3) in greater detail. In response to receipt of the updated host mapping record sent in step 408 (FIG. 4) the tag processing code updates the SAN mapping record as indicated in step 500. The host mapping record may be limited to the applications running on that host, but the SAN mapping record may include ID-to-application mappings for the applications running on multiple hosts. Further, the SAN mapping record may include per-application ID dedup settings and dedup statistics. In response to receipt of the tagged IO sent from the host in step 416 (FIG. 4) the SAN fetches the tag value from the SCSI or NVMe CDB reserved fields as indicated in step 502. The fetched tag value is moved from the IO command reserved fields into the IO structure as indicated in step 504. The tag processing code obtains the tag value from the IO structure and refers to the SAN mapping record to determine whether deduplication is enabled for the unique application ID as indicated in step 506. If deduplication is disabled for the unique application ID, then the IO data is not deduped as indicated in step 508. If deduplication is enabled for the unique application ID, then the IO data is hashed and deduped using the hash value as indicated in step 510.

Deduplication results of the IO data are used to update the deduplication statistics corresponding to the unique application ID in the SAN mapping record as indicated in step 512. For example, the number of dedup attempts and/or amount of data for which deduplication has been attempted and dedup ratio may be updated. If at least a predetermined number of dedup attempts or amount of data has been deduped and the updated dedup ratio is below a predetermined threshold then the deduplication settings in the SAN mapping record are updated as indicated in step 516. For example, and without limitation, if the dedup ratio is below 2:1 then deduplication may be disabled for the unique application ID. Sample pseudo code may be:
if (index==5)
{
Do not calculate hash
Do not search for hash
In such a case:
Directly Allocate the physical block and write the new data.
Update the logical Block number to physical block number map as one to one.
}
The updated deduplication statistics are shared with other SANs as indicated in step 514. As indicated in step 518, receipt of deduplication statistics from other SANs prompts update of the SAN mapping record.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. A method comprising:
in a block-based storage system:
receiving an input-output (IO) command to write data to a logical device that is maintained by the block-based storage system;
receiving a hint that identifies an application that generated the IO command; and
selectively performing deduplication of the data based on the application identified by the hint.

2. The method of claim 1 wherein receiving the hint comprises receiving a unique application identifier in a tag.

3. The method of claim 2 comprising updating deduplication statistics associated with the unique application identifier.

4. The method of claim 3 comprising updating deduplication enablement settings based on the deduplication statistics.

5. The method of claim 4 comprising sending the deduplication statistics to another block-based storage system.

6. The method of claim 4 comprising updating deduplication enablement settings based on deduplication statistics received from another block-based storage system.

7. The method of claim 2 comprising:
in a host:
obtaining the unique application identifier in response to generation of the IO command by the application, wherein the application runs on the host.

8. The method of claim 7 comprising, in the host, sending the unique application identifier to the block-based storage system in a tag associated with the IO command.

9. The method of claim 2 comprising:
in a host:
creating the unique application identifier in response to generation of the IO command by the application, wherein the application runs on the host; and
providing a mapping between the application and the unique application identifier to the block-based storage system.

10. An apparatus comprising:
a block-based storage system comprising:
a plurality of compute nodes;
an array of drives managed by the compute nodes; and
computer program code comprising:
instructions that receive an input-output (IO) command to write data to a logical device that is maintained by the block-based storage system;
instructions that receive a hint that identifies an application that generated the IO command; and
instructions that selectively perform deduplication of the data based on the application identified by the hint.

11. The apparatus of claim 10 wherein the instructions that receive the hint comprise instructions that receive a unique application identifier in a tag.

12. The apparatus of claim 11 comprising instructions that update deduplication statistics associated with the unique application identifier.

13. The apparatus of claim 12 comprising instructions that update deduplication enablement settings based on the deduplication statistics.

14. The apparatus of claim 13 comprising instructions that send the deduplication statistics to another block-based storage system.

15. The apparatus of claim 13 comprising instructions that update deduplication enablement settings based on deduplication statistics received from another block-based storage system.

16. The apparatus of claim 11 comprising:
a host computer comprising processor resources, memory resources, and computer program code comprising instructions that obtain the unique application identifier in response to generation of the IO command by the application, wherein the application runs on the host.

17. The apparatus of claim 16 comprising, in the host, instructions that send the unique application identifier to the block-based storage system in a tag associated with the IO command.

18. The apparatus of claim 11 comprising:
a host computer comprising processor resources, memory resources, and computer program code comprising instructions that create the unique application identifier in response to generation of the IO command by the application, wherein the application runs on the host and provide a mapping between the application and the unique application identifier to the block-based storage system.

* * * * *